No. 661,469. Patented Nov. 6, 1900.
G. EASTMAN.
ROLL HOLDING CAMERA.
(Application filed Aug. 24, 1899.)

(No Model.) 3 Sheets—Sheet 1.

Witnesses.
Walter B. Payne.
G. Willard Rich.

Inventor,
George Eastman
by Frederick F. Church
his Attorney

No. 661,469.　　　　　　　　　　　　　　　Patented Nov. 6, 1900.
G. EASTMAN.
ROLL HOLDING CAMERA.
(Application filed Aug. 24, 1899.)

(No Model.)　　　　　　　　　　　　　　　3 Sheets—Sheet 2.

Witnesses:
Walter B. Payne
G. Willard Rich.

Inventor:
George Eastman
by Frederick H. Church
his Attorney

THE NORRIS PETERS CO., PHOTO-LITHO., WASHINGTON, D. C.

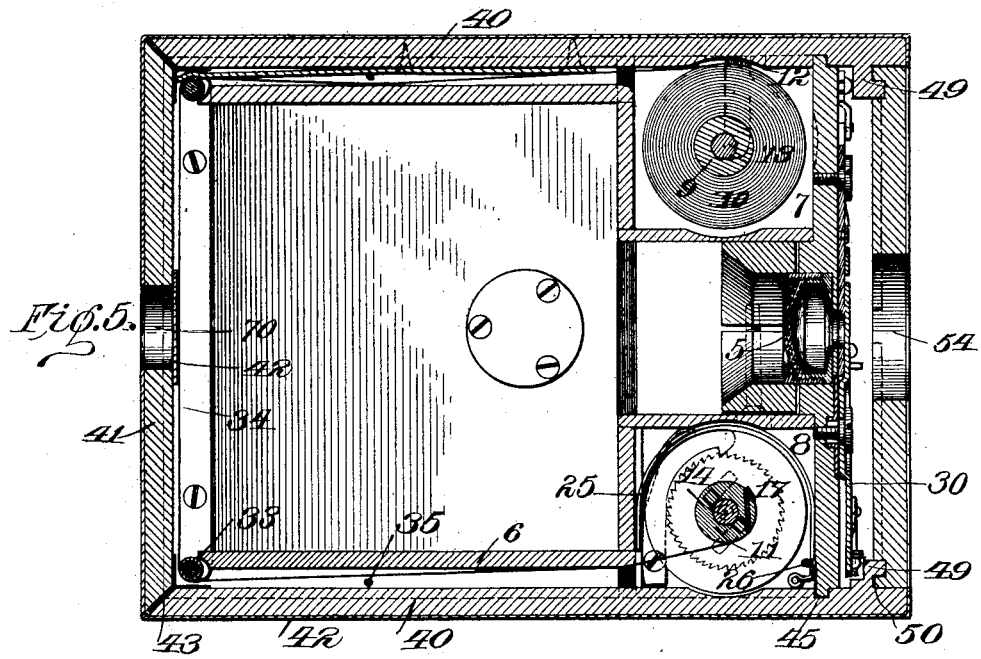

UNITED STATES PATENT OFFICE.

GEORGE EASTMAN, OF ROCHESTER, NEW YORK, ASSIGNOR TO THE EASTMAN KODAK COMPANY, OF SAME PLACE.

ROLL-HOLDING CAMERA.

SPECIFICATION forming part of Letters Patent No. 661,469, dated November 6, 1900.

Application filed August 24, 1899. Serial No. 728,274. (No model.)

*To all whom it may concern:*

Be it known that I, GEORGE EASTMAN, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention has for one object to provide an improved photographic camera adapted for making a series of pictures or exposures upon a strip of sensitized film carried upon a spool and adapted to be drawn therefrom and wound upon a similar spool as the various exposures are made; and it has for its further object to provide a camera in which the film wound upon the spools may be easily inserted or removed and the construction simplified.

To these and other ends the invention consists in certain improvements in construction and combinations of parts, all as will be fully described, and the novel features pointed out in the claims at the end of this specification.

Figure 1:
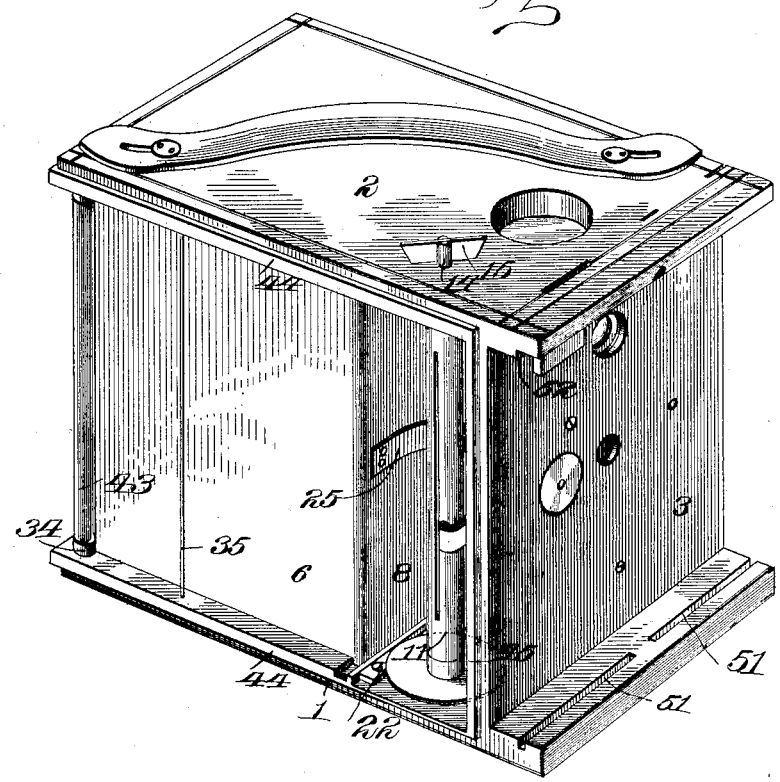
Figure 3:
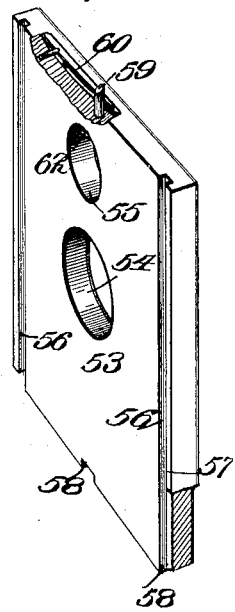
Figure 7:
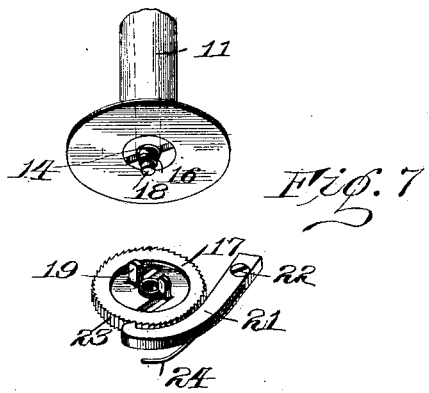
Figure 6:
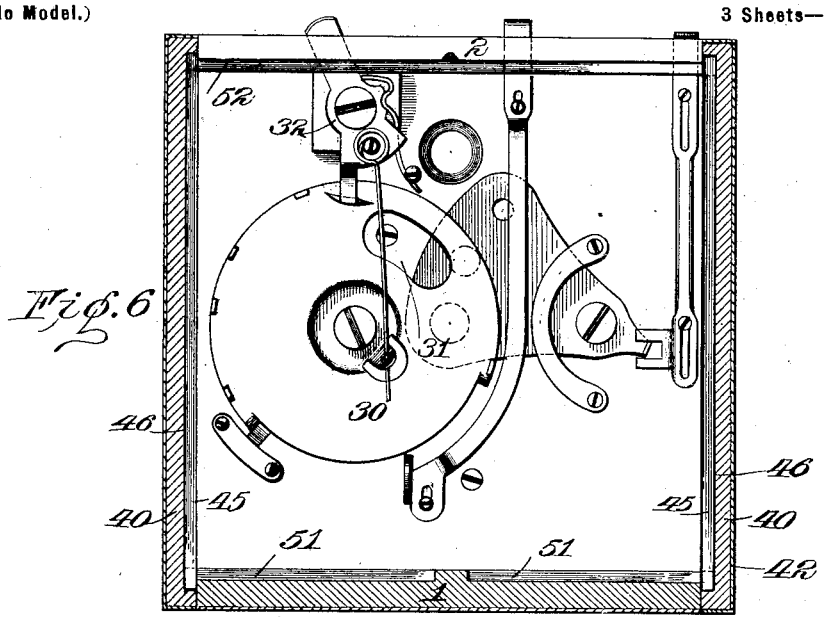
Figure 2:
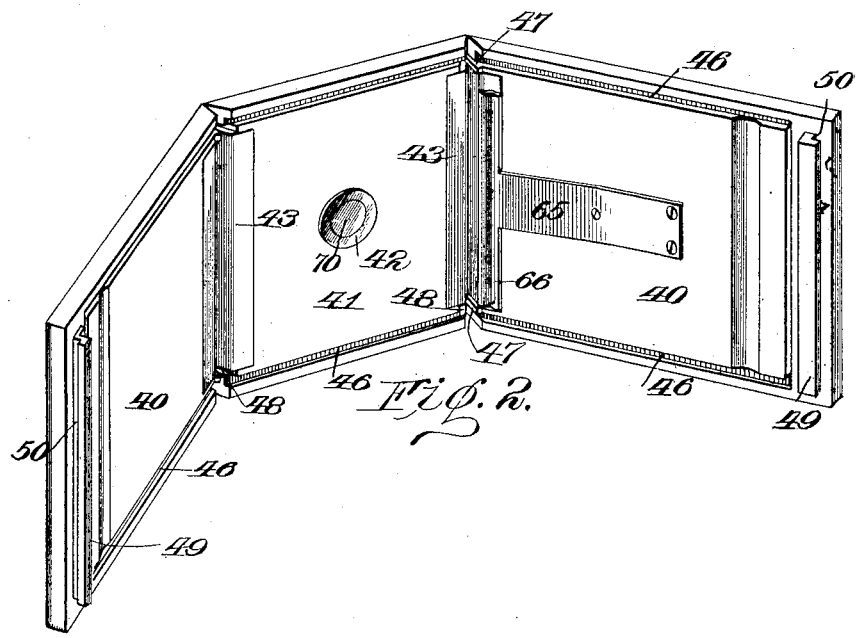

In the drawings, Figure 1 is a perspective view of the body of a camera constructed in accordance with my invention, the removable covering being omitted; Fig. 2, a similar view showing the covering for the sides and rear end; Fig. 3, a view of the forward or locking section of the covering; Fig. 4, a vertical sectional view through the camera; Fig. 5, a horizontal sectional view thereof; Fig. 6, a front end elevation showing the shutter; Fig. 7, a detail perspective view of the ratchet mechanism upon the receiving-spool.

Similar reference-numerals in the different figures indicate similar parts.

In constructing a camera in accordance with my invention I employ a hollow body substantially rectangular in form, having the base or bottom 1, the top 2, the front 3, carrying the shutter mechanism and provided in the rear of the latter with the lens 5, and the sides 6. Arranged in the latter and at the rear of the front 3 are chambers 7 and 8, the former adapted to contain the spool 9, carrying the unexposed film 10, and the latter the receiving or winding spool 11, capable of being revolved in one direction from the exterior of the camera to wind up the film after each exposure, bringing a fresh unexposed surface in the rear of the lens each time until finally the entire strip of film is wound thereon, when the spool may be removed. Located at the top and bottom of the chamber 7 are slots 12, (shown in dotted lines,) arranged forward of the center of the spool and extending inwardly from the edges of the body, having their extremities extending rearwardly, forming sockets in which are supported the ends of an arbor or rod 13, extending through an aperture in the spool 9, forming a bearing or support for the latter. By employing this method for supporting the spool I am enabled to use the carrying and winding spools interchangeably, requiring but one form of spool for both purposes, and as the film is always drawn toward the rear of the camera the rod is constantly held in engagement with the extremities of the slots and prevented from accidental removal by reason of their angular arrangement.

The spool 11, located in the pocket 8, is adapted to be rotated in one direction to wind up the film after each exposure, and to accomplish this I provide the spindle 14, extending through an aperture in the top 2 and through the spool 11, having the winged head 15 upon the upper end, the threaded portion 16, near its lower end, adapted to engage with a ratchet-wheel 17 and the smooth extremity 18 extending below the latter and serving to center and form a bearing for the end of the spindle by operating in an aperture formed in the lower end of the chamber. The ratchet-wheel 17 is provided with two lugs 19, punched out from the wheel and extending upwardly upon either side of the central aperture adapted to engage in a slot formed in the lower end of the spool. A spring-operated pawl 21, pivoted upon a screw 22, is held in engagement with the teeth 23 on the ratchet-wheel by means of a spring 24. By reason of this arrangement the construction is greatly simplified, the winding-spool is held in engagement with the ratchet-wheel, and the latter is prevented from being revolved in but one direction by the pawl, which also serves to hold the wheel while the post 14 is being disconnected to allow the removal of the spool. In order that the spool may be easily removed from the chamber after the removal of the spindle, I provide a band or tape 25, extending around the interior of the pocket and secured at one end and having its free end passing loosely beneath a staple 26, whereby the spool may be ejected by drawing the free end of the tape outward, as will be understood.

Mounted upon the front 3 of the body is the shutter mechanism, consisting of the oscillatory disk 30, provided with the aperture 31, adapted to be operated by an actuating device 32; but as this forms no part of my present invention a detailed description of this structure, together with the coöperating devices, will be omitted.

To facilitate the movement of the film in its transmission from one spool to the other around the rear of the camera-body, I provide rollers 33, revolving in bearings provided at the extremities of the strips 34, extending between the sides 6 and across the top and bottom of the body. 35 indicates guide-rods located at the sides of the body and beneath which the film and enveloping paper are threaded.

The casing or covering for the body is adapted to inclose the sides and ends of the latter to exclude the light, and to accomplish this I provide the removable sides 40 and end covering 41, having mitered joints at their meeting edges, and hinged or flexibly connected together by strips 43 of flexible cloth or other material, the joints being further strengthened and covered by the covering 142 of leather or other finishing material applied to the exterior of the camera. In order that these portions may be held firmly in position upon the camera-body, I provide tongues 44, extending around the top and bottom boards 1 and 2, meeting at their forward ends, the tongue 45 at the side edges of the front board 3, said tongues or ribs entering the grooves 46, formed in the side and end boards 40 and 41 when the parts are assembled.

47 indicates ribs or projections extending from the beveled portions of the side boards 40, arranged in line with the inner sides of the grooves 46 and adapted to enter slots 48, formed in the proximate beveled faces of the end 41, preventing ingress of light at these points. The side boards are each provided upon the inside and at their forward ends with vertical strips 49, adapted to extend between the top and bottom of the body portion, which are cut away at their forward sides next the casing, forming the recesses 50. Upon the inner surface of the bottom 2 are provided grooves or recesses 51, and the under side of the central portion of the top 1 is also cut away, forming the notch 52 upon the forward edge. The front board of the covering is adapted to be secured to the top and bottom of the camera-body and to fit between the sides 40, engaging the latter and holding the parts securely in position. This front board is shown particularly in Fig. 3 and consists of a rectangular plate 53, having the lens-apertures 54 and 55 and provided with the vertical grooves 56 at the sides, forming the tongues 57, adapted to engage in the grooves or recesses 50 on the sides 40 when in position, securing the latter in position upon the body. Ribs or flanges 58 extend from the bottom of the front board, engaging in each of the slots 51, and arranged in the upper edge is a catch 59, normally extended by a spring 60 and adapted to engage in a notch 52, provided upon the under side of the top 1. The catch is preferably located above the upper lens-aperture 55 and extending into the latter is provided with a head 62, whereby it may be retracted, allowing the section to be removed.

Located upon the sides of the side board or covering 40 adjacent to the pocket 7, containing the unexposed film, I provide a spring-plate 65, having the vertically-extending arms 66, adapted to bear against the film and paper passing over the roller 33 to create a sufficient friction upon the film, whereby as the latter is wound upon the receiving-spool it will be drawn taut, presenting a flat field in the rear of the lens. As shown, the camera is designed to employ that class of film known as "daylight-loading cartridges," in which the film is wound upon the spool, together with a continuous strip of black paper or other opaque material, and upon the outer surface of such covering-strip are designating-numerals or other marks indicating the number of exposures made and showing when the film has been wound the proper distance.

70 indicates an aperture having the covering 42, of ruby glass, provided in the back 41, through which the operator may observe the movement of the film.

The camera as a whole is simple and easily put together; but its particular feature is the facility with which access may be had to the interior parts and the film be inserted and removed and as the cover is placed around the film and paper and secured the difficulty heretofore existing in some cameras of the film and paper catching on the edge of the casing when the body is inserted in the latter is entirely obviated.

It is preferred that the camera be made of wood and covered with leather or similar material; but it is obvious that it could be made of light metal, as aluminium, and the advantageous features preserved.

I claim as my invention—

1. In a camera the combination with the body having the central chamber, the film-chambers and the film-guides, of a removable casing for said body embodying the three connected covering-pieces and a separate removable fourth covering-piece interlocking with two of the others to hold the casing around the body.

2. In a camera the combination with the body having the central chamber, the film and the film-guides, of a removable casing for said body embodying a plurality of connected covering-pieces, and a detachable covering and locking-piece interlocking with two of the others and also with the body to hold the parts together.

3. In a camera, the combination with a body, of the end casing-section, the side casing-sections, flexible connections between the former and the latter, and the second end casing-section or locking-board engaging with the body and side coverings, securing the parts in position upon the body.

4. In a camera the combination with the body having the film-support and the open-sided chambers, of a detachable casing composed of the connected sections coöperating at their edges with the body and a removable casing-section engaging the casing and the body and a detachable fastening for holding said section in position to secure the parts.

5. In a photographic camera, the combination with the body having the top and bottom portions, of a removable sectional casing adapted to inclose the body and to be held in engagement with the edges of the top and bottom of the body by means of a key or locking-piece formed by one of the said casing-sections.

6. In a camera, the combination with the body having the top and bottom, the film-support and film-chambers at the sides, of the removable side and end casing-sections coöperating with the top and bottom of the body and with each other to inclose the body and a single detachable fastening for holding said parts in engagement.

7. In a photographic camera, the combination with the body, the top and bottom portions secured thereon, the front portion extending between them, and the rib formed upon the sides of the latter and upon the sides and rear ends of the top and bottom portions, of the interlocking sectional casing inclosing the body, engaging with the edges of the top and bottom portions and provided with the grooves adapted to receive the rib, and means for detachably securing the casing-sections together around the body.

8. In a photographic camera, the combination with the body provided with the top and bottom portions, and the front portion extending between them in rear of their forward edges, having the rib formed at the sides of the front and extending around the sides and rear of the top and bottom, and the grooves or notches formed upon the inner surfaces of the forward-projecting portions of the latter parts, of the detachable sectional end casing-section and the side sections connected thereto adapted to engage the edges of the top and bottom and having the grooves to receive the rib, the forward end section engaging the side portions and secured in the notches formed in the forward-extending ends of the top and bottom.

9. In a camera, the combination with a body having the top and bottom portions, of the detachable end and side casing-sections connected thereto and adapted to surround the body, the strips located near the forward edges of the side coverings, having the grooves and the end covering engaged between the top and bottom, having the tongues at its edges engaging in the grooves in the strips to secure the side and end sections in engagement with the edges of the top and bottom portions of the body.

10. In a camera, the combination with a body having the top and bottom portions, the front extending between them, the film-chambers arranged in the body in rear of the front, and the film-support located at the rear of the body, of the detachable sectional covering extending around the body engaging the top and bottom thereof and adapted to be locked thereon by the application of one of the covering-pieces.

11. In a camera, the combination with a body having the top and bottom portions, the front extending between them in rear of their forward edges, the film-chambers arranged in the body, and the film-support located at the rear of the body, of the detachable sectional casing, the spring arranged on one of the sections and bearing against the film, and means for locking the various casing-sections upon the body by the application of one of the detachable sections.

12. In a camera, the body having the film-chambers, the combination with a winding-spindle accessible from the exterior of the casing, having the threaded portion near the lower end and the projection or bearing extending beyond the latter, of a ratchet-wheel having the screw-threaded aperture, and the lugs arranged upon the sides thereof and adapted to engage the film-spool, and a pawl in the body adapted to engage the wheel to permit its revolution in one direction only.

13. The combination with the body, having a film-chamber, a removable spindle having bearings in the body and adapted to extend through the spool, the loose removable ratchet-wheel with which the spindle engages having the lugs punched therefrom for engaging the spool, and a pawl coöperating with the ratchet-wheel.

14. In a camera, the combination with the body composed of the connected top and bottom portions, of an enveloping casing composed of three connected boards or sections adapted to coöperate with the sides and end of the body, and a fourth removable board or section coöperating with the others and with the body to lock the casing in position on the latter.

15. In a camera, the combination with the body composed of the connected top and bottom portions, of an enveloping casing embodying the three boards or sections flexibly connected and having a detachable tongue-and-groove connection with the body, and a removable fourth or securing section of the casing coöperating by tongue-and-groove joints with the body and the casing and locking all said parts together when in position.

16. In a camera the combination with the body consisting of the top and bottom portions and having the open film-receiving chambers at the side, the film-support at the rear, the front board and a shutter on its exterior, of a casing, embodying the sides and end sections coöperating with the top and bottom portions of the body, and inclosing the film-chambers support and shutter, one of said sections interlocking with the others and with the body to hold the casing in position and a detachable catch for holding said section in engagement.

GEORGE EASTMAN.

Witnesses:
ALICE K. WHITNEY,
GRACE O. RODA.